United States Patent
Penta et al.

(10) Patent No.: US 10,247,853 B2
(45) Date of Patent: Apr. 2, 2019

(54) ADAPTIVE ECOSYSTEM CLIMATOLOGY

(71) Applicant: The United States of America, as represented by the Secretary of the Navy, Washington, DC (US)

(72) Inventors: Bradley Penta, Slidell, LA (US); Sergio deRada, Pearl River, LA (US); Richard W. Gould, Jr., Pearl River, LA (US); Sean C. McCarthy, Carriere, MS (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 281 days.

(21) Appl. No.: 15/092,227

(22) Filed: Apr. 6, 2016

(65) Prior Publication Data
US 2016/0291203 A1    Oct. 6, 2016

Related U.S. Application Data

(60) Provisional application No. 62/143,304, filed on Apr. 6, 2015.

(51) Int. Cl.
*G01W 1/00* (2006.01)

(52) U.S. Cl.
CPC ..................... *G01W 1/00* (2013.01)

(58) Field of Classification Search
CPC ................. G01W 1/00; G06K 9/62
USPC .............................. 702/2, 23, 150
See application file for complete search history.

(56) References Cited

U.S. PATENT DOCUMENTS

| | | | | |
|---|---|---|---|---|
| 5,568,450 | A * | 10/1996 | Grande | G01S 7/527 367/131 |
| 6,985,929 | B1 * | 1/2006 | Wilson | G06F 17/30241 701/532 |
| 2014/0007017 | A1 * | 1/2014 | Sternfeld | G06F 17/30241 715/848 |
| 2014/0156806 | A1 * | 6/2014 | Karpistsenko | H04L 29/06027 709/219 |

OTHER PUBLICATIONS

Fox, Daniel, Barron, Charlie, Carnes, Michael, Booda, Martin, Peggion, Germana, Van Gurley, John, The Modular Ocean Data Assimilation System, Oceanography, vol. 15, No. 1, pp. 22-28, Oceanography Society, 2001.

Fox, D.N., Teague, W.J., Barron, C.N., Carnes, M.R., The Modular Ocean Data Assimilation System (MODAS), Journal of Atmospheric and Oceanic Technology, vol. 19, pp. 240-252, Jun. 15, 2001.

* cited by examiner

*Primary Examiner* — Dzung Tran
(74) *Attorney, Agent, or Firm* — US Naval Research Laboratory; William P. Ladd

(57) ABSTRACT

System and method for rapidly merging earth observations with numerical simulations to provide an on-line decision-support tool for ecological forecasting. The output products will be gridded fields that incorporate both climatological variability and real-time observations. The system and method are based upon four elements: 1) a long-term, coupled biological-optical-physical simulation model run, 2) earth observation (EO) time-series (remote sensing), 3) historical in-situ data, and 4) real-time remote sensing data and in-situ observations.

20 Claims, 9 Drawing Sheets

ADAPTIVE ECOSYSTEM CLIMATOLOGY

CROSS-REFERENCE TO RELATED APPLICATIONS

This application is a non-provisional application claiming priority to provisional application 62/143,304 filed on Apr. 6, 2015, under 35 USC 119(e). The entire disclosure of the provisional application is incorporated herein by reference.

BACKGROUND

In coastal zone management, the U.S. government provides guidance to the states, which then implement the objectives of the Coastal Zone Management Act of 1972 and Federal Water Pollution Control Amendments of 1972, Clean Water Act of 1977, and the Water Quality Act of 1987. To enhance state and federal decision-making processes related to the development of outer continental shelf energy and mineral resources, potential environmental impacts from exploring and extracting resources (such as oil and gas) in compliance with numerous environmental statues, regulations, and executive orders (e.g., OCSLA and NEPA) need to be assessed. Size, timing, and location of future lease sales are all issues with respect to resource exploration and extraction.

Currently, ecological forecasting used in the decision-making process for ecosystem and resource management frequently relies upon historical in-situ measurements (often presented as climatological products), earth observations (EO) from remote sensing platforms, or various types of models. Each of these elements has inherent limitations and errors. In-situ data, expensive and time-consuming to collect, frequently contains many gaps and are subject to temporal and spatial aliasing. Methods to reduce theses effects result in coarse grained, low temporal resolution products. Climatologies are also generally of low spatial and temporal resolution (monthly, seasonal, or annual means). Remote sensing products (EO), as from Ocean Color satellites (CZCS, SeaWiFS, MODIS, MERIS, OCM, etc.), provide daily, high-resolution data sets. These data, however, have their own limitations, such as data gaps caused by cloud coverage and contamination of the signal in near-shore environments by atmospheric aerosols, bottom reflectance, and contamination from coastal runoff. Coastal waters, rich in admixed organic and inorganic material, require sophisticated, but subjective remote-sensing algorithms to deconvolve the individual constituents. These instruments measure an integrated signal from the upper ocean, often missing ecologically important subsurface layers. Models too have their limits. They are based upon assumptions and simplifications that introduce errors and biases. Models often require specialized skill and knowledge to set-up, fine-tune, and execute; additionally, they usually require high-performance computing resources. Furthermore, models require initialization and boundary conditions at different spatial and temporal scales. For example, fisheries models require temperature and chlorophyll fields over a large, coarse grid, while oyster reef models require temperature, salinity, currents, and chlorophyll on a small spatial scale but with high spatial resolution.

SUMMARY

Methods and systems disclosed herein relate generally to resource management, utilization, and ecosystem decision making. Embodiments of the system and method provide a rapid merger of earth observations with numerical simulations to provide an on-line decision-support tool for ecological forecasting. The output products can be gridded fields that incorporate both climatological variability and real-time observations. The system and method are based upon four elements: 1) a long-term, coupled biological-optical-physical simulation model run, 2) earth observation (EO) time-series (remote sensing), 3) historical in-situ data, and 4) real-time remote sensing data and in-situ observations.

The system and method statistically meld climatological data with up-to-date observational data to create a fast analysis in which no model run is necessary. Climatological databases, at best, can provide typical conditions for a particular week. While this database would give an idea of environmental conditions for that week, it would not capture any anomalous conditions (e.g. Hurricanes Katrina and Rita in September 2005). The system and method of the present embodiment build a static climatology to use as a first guess, and incorporate observational data via statistical assimilation (optimal interpolation) to adjust that climatology to current (and more accurate) conditions. This done, computation of variables for any day, any year, can be completed without the execution of a numerical model, i.e. much more rapidly.

DETAILED DESCRIPTION

Figure 1A:
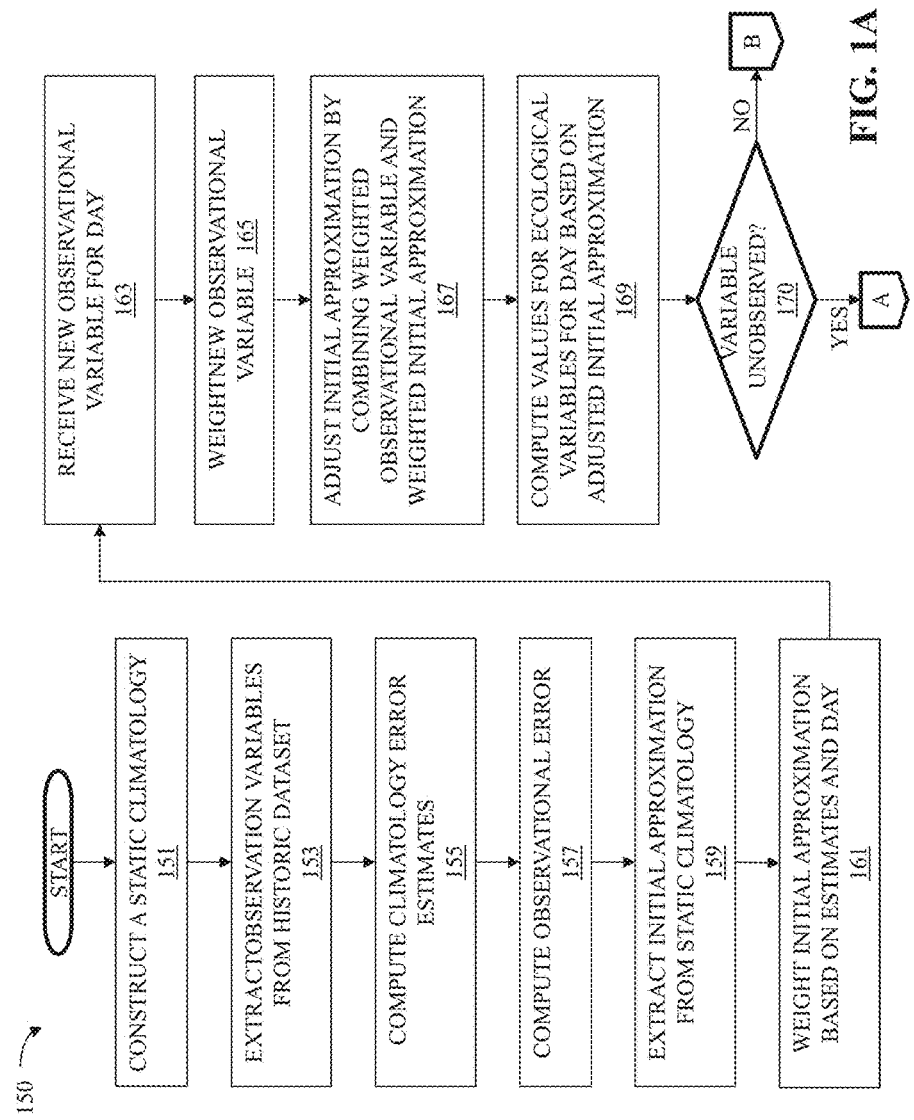
FIGS. 1A-1B are a flowchart of a method for adaptive ecosystem climatology (AEC)

Embodiments described herein blend the strengths of three elements (EO, in-situ data, models) into one flexible product that can provide a computation of variables, whether it be a hindcast, a nowcast, or a forecast, without the overhead of executing a numerical model. For example, an example system is described that produces a gridded set of coherent ecological products, in dynamic balance, with data gaps, inherent in observational data, filled, which can be mapped to any target user grid to address specific needs and objectives. Such a system does not require re-execution of a model for the assimilation of observational data to lead to more accurate short term forecasts because the entire time-series, from the point of data assimilation forward, should be adjusted based on e-folding (weights) time scales. Further, pertinent observations are ingested into a climatological background field to improve the solution in general, where the local observations allow consistency checks and can influence the ecological products in time and space.

In some embodiments, a method for ecological forecasting can include, but is not limited to including, constructing a climatology dataset (also referred to herein as "climatology") for each calendar day (for each of the 366 days in a year) based on long term model simulation data which includes multiple variables, and extracting from an archive of historic observations (also referred to herein as "historical observations"), the variables that match those in the climatology, at least two observation variables. The method can also include computing error estimates of the climatology dataset using the historical observations dataset, computing observational error estimates based on the historical observations dataset, and computing statistical parameters associated with the historical observations dataset. The method can still further include extracting an initial approximation of one or more variables, for a given day, from the climatology, weighting the initial approximation based on the climatology error estimates and the pre-selected month and day, and receiving at least one new observational variable for the pre-selected month and day. The method can even still further include applying the precomputed weights, based on the observation error estimates, to the new observational variable(s), and incrementing the initial approximation of one or more variables using optimal interpolation to combine the weighted new observational variable(s) and the weighted initial approximation. Optionally, the method can include computing climatology spatio-temporal multi-variate covariances among the climatology values, computing observational spatio-temporal multi-variate covariances among the observational values, computing at least one unobserved variable based on the received at least one new observational variable and the observational covariances, weighting the at least one unobserved variable based on the observational error estimates, incrementing the initial approximation of one or more variables using optimal interpolation to combine the weighted new observational variable(s) and the weighted initial approximation, and dynamically adjusting the plurality of variables based on the climatology covariances.

Figure 1B:
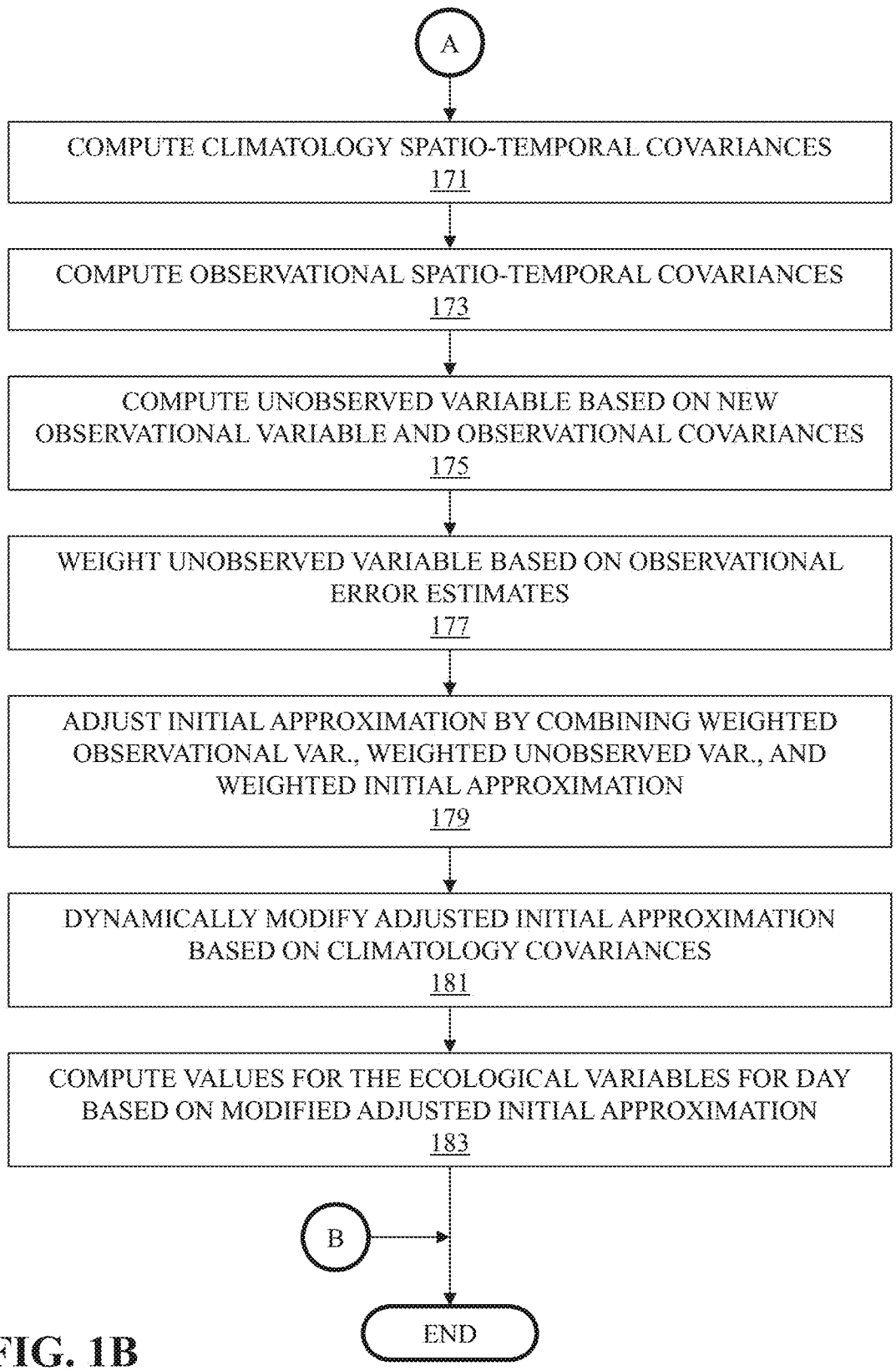

Referring now to FIGS. 1A-1B, method 150 for non-numerical model forecasting of ecological variables can include, but is not limited to including, constructing 151 a climatology dataset having ecological variables for each calendar day based on long term model simulation data including a plurality of variables, extracting 153, from historical observations dataset, observation variables that match at least two of the climatology variables; computing 155 climatology error estimates of the climatology dataset based on the historical observations dataset, computing 157 observational error estimates based on the historical observations dataset, and extracting 159 an initial approximation of at least one climatology variable, for a pre-selected given day, from the climatology dataset. At this stage, the initial approximation can be rendered on a user display. Method 150 can also include weighting 161 the initial approximation based on the climatology error estimates and the pre-selected month and day, receiving 163 at least one new observational variable for a the pre-selected month, day, and year, weighting 165, based on the observation error estimates, the at least one new observational variable, adjusting 167 the initial approximation by combining the weighted at least one new observational variable and the weighted initial approximation using optimal interpolation, and computing 169 the ecological forecast (e.g., predicted value) for the pre-selected month, day, and year based on the adjusted initial approximation. The rendering on the user display can now be updated according to the adjusted initial approximation. If 170 the variable is unobserved, method 150 can optionally include computing 171 climatology spatio-temporal multi-variate covariances among the climatology values, computing 173 observational spatio-temporal multi-variate covariances among the observational values, computing 175 at least one unobserved variable based on the received at least one new observational variable and the observational covariances, and weighting 177 the at least one unobserved variable based on the observational error estimates. Method 150 can further optionally include, if 170 the variable is unobserved, adjusting 179 the initial approximation by combining the weighted at least one new observational variable, the weighted at least one unobserved variable, and the weighted initial approximation using optimal interpolation, dynamically 181 modifying the adjusted initial approximation based on the climatology covariances, and computing 183 the ecological forecast for the pre-selected month, day, and year based on the dynamically modified adjusted initial approximation. Again, the rendering on the user display can be updated according to the modified adjusted initial approximation. In this manner, the rendering on the user display can be iteratively updated as additional observations are incorporated into the approximation. Such updates allow more accurate information to be reflected on the display in a timely manner because optimal interpolation is used to expedite the incorporation.

In some cases, the user display can notify the user when new observation data are received. The notification can allow the user to request that the new observation data be incorporated into the initial approximation so that more accurate, recent information is made available to the user.

The system and method of the present embodiment can rely for its climatological dataset on a reanalysis simulation conducted using a numerical simulation model system. This model system can include a biochemical-optical (lower ecosystem) model coupled to a physical circulation model. Decadal-scale ensembles produced by this data-assimilating model system can be melded with the EO time-series and in-situ data. A long time-series of model high-frequency output can be used as a background to combine the EO and in-situ observational data into a regularly spaced and temporally concurrent estimate of prognostic and diagnostic fields. Hydrodynamics, inherent in the model high-frequency output, can impart dynamical stability, temporal continuity, and feature evolution into these estimates.

The primary methodology employed in the system and method of the present embodiment is objective analysis (OA) or optimum/optimal interpolation (OI) (Gandin, L. S., *Objective Analysis of Meteorological Fields*, Translated (1965) from Russian by Israel Programme for Scientific Translation, Jerusalem, 242 pp., 1963); Bretherton et al., *A Technique for Objective Analysis and Design of Oceanographic Experiments Applied to MODE-73, Deep Sea Res.*, 23, 559-582, 1976; see also www.asp.ucar.edu/colloquium/1992/notes/part1/node121.html).

OI is a technique for assimilating observational data into an initial background field using statistical descriptions of the data. Given an initial approximation, an error estimate associated with the initial approximation, and knowledge about the historical length and time scales of variability in the area, the OI technique provides a set of weights to apply to the data in order to coherently combine the weighted data with the initial approximation. The result is a new estimate of the field, along with an estimate of its accuracy, directly influenced by observations, thus increasing the skill of the prediction. All available recent observations are subtracted from a climatological field to produce a set of anomalies. At each point in the grid, and at each desired depth, a weighted estimate of these anomalies is computed using OI. The resulting 3-D field of anomalies is then used to derive the final prediction. Additionally, using multivariate correlations, other fields are derived using pre-computed regression relationships. This process can be repeated for other variables, combining the derived results iteratively until all available data are assimilated and convergence of the regression is achieved. In this way, an increasingly accurate estimate of the ocean structure can be produced depending on the availability and accuracy of earth observations and in-situ measurements. Lacking any measurements, the result is simply the climatological long-term mean absent of specific feature details or transient events such as fronts and eddies. The associated time-scales provide e-folding criteria to dynamically incorporate historical and current observations and produce past, present, and future predictions able to portray time and space varying dynamical features, indicative of episodic or anomalous events.

Optimal interpolation (OI) or objective analysis can be used for weather forecasting and prediction whereby an analysis of observations sets the initial state of a system (i.e. model) as a start of an integration (in time) to produce a forecast. In this traditional configuration, OI relies on a previous forecast of the model to provide a first guess, onto which the available observations are projected, to provide an incremental (correction) update to this initial estimate. Iterating on this forecast-analysis-forecast cycle materializes an OI-based data-assimilative forecasting and prediction system.

AEC-OI is based on this principle but is inherently different and simplified because (1) AEC-OI uses a prebuilt and independent climatology and (2) error metrics, instead of relying on its own cyclic forecast. To this effect, the climatology provides a background field rather than a first guess. Therefore, AEC-OI simply performs an instantaneous and independent analysis of available observations, conformal with the climatology though not necessarily coincident in space or time, and optimally (minimizing the expected errors) blends those observations into the climatology. Then, to weigh the observations, only spatial and temporal length scales are needed. There are no cyclic dependencies or potential for dynamical imbalances resulting from iterative injection of observations, facilitating a much faster and straight forward OI computation of an analysis. Furthermore, in AEC-OI, given that the AEC climatologies are pre-computed, and the historical observations (i.e. satellite timeseries) are known a-priori, error covariances are also precomputed based on correlation length scales. The blending methodology is based on the theory of objective analysis where an optimal weight, based on these covariances, is computed via a minimization of the expected error of the analysis field. Additionally, AEC-OI implements custom correlation scales to compute these weights and produce the blended product, which increases the affinity of the interpolation based on the scales and physical characteristics of the variables being analyzed and the known errors (synoptic, representative, instrument) of the data. This allows users to further calibrate the OI results according to how much they "trust" their data.

The foundation of optimal interpolation is based on:

$$X_a = X_b + W[Y_o - H(X_b)] \quad (1)$$

Capital bold letters represent matrices. Equation 1 states that an analysis ($X_a$) is based on linearly combining a background field ($X_b$) with observations ($Y_o$) via a set of weights (W). The [$Y_o - H(X_b)$] term, called the innovation, is the difference between the observations ($Y_o$) and the background field ($X_b$) translated to observation space via the H operator. In other words, H (also called observation operator) maps from analysis/background (X) space to observation space (Y). This mapping can include interpolation in time and/or space as well as conversion from observed variables that are not the same as the background variables. This usually requires non-linear transformations, but in AEC-OI, all variables are conformal with the observations—either observed and background variables are the same, or they are linearly related, and thus only spatial and temporal interpolation is usually needed. Therefore, since the H operator is just an interpolator in time and/or space, to simplify the AEC-OI derivation, H is assumed linear (i.e. $H*X_b$); to be coincident in space and time with $Y_o$. Therefore, the computation of W becomes the main focus of deriving $X_a$, which now includes the current date (e.g. May 20, 2010 3 pm) since actual observation times have been incorporated. Note: $X_b$ is only representative of a climatological day (e.g. May 20) as detailed below.

The long term mean computed from a multi-decadal three-dimensional (3D) Numerical Bio-Optical-Physical Ecosystem Ocean Model simulation forms the Static Ecosystem Climatology (SEC) (a temporal daily average of all simulation years). This climatology, representative of typical environmental conditions for each calendar day, is the background (or first guess) $X_b$. Thus, computation of the AEC SEC is basically an arithmetic mean of the daily model output across all years:

$$X_b(x, y, z, t(j)) = \frac{1}{ye - ys + 1} \sum_{yyyy=ys}^{yyyy=ye} X(x, y, z, t(j, yyyy)), \quad (2)$$

where X denotes a model state variable in 4 dimensions (x,y,z,t) and $X_b$ is the resulting arithmetic mean in time for each day of the year across all years (yyyy) starting in year $y_s$ and ending in year $y_e$; with j denoting the Julian day of the year (1:366). Note: the "current" year is not integrated and not part of the result $X_b$.

Using independent observations ($Y_o$) that have not been assimilated or used to constrain the model simulations and thus the climatology (important in the context of AEC-OI since the assumption on errors is that errors in the background and the observations are not biased or correlated, i.e. $\varepsilon(E_b)=\varepsilon(E_o)=\varepsilon(E_b+E_o)=\varepsilon(E_b E_o)=0$, where $\varepsilon$ is the expectation operator), AEC-OI implements OI as follows:

From the OI equation:

$$X_a = X_b + W[Y_o - H(X_b)] \quad (3)$$

The background ($X_b$) and the observation ($Y_o$) errors can be modeled with respect to the true state of the ocean, $X_t$, which is not known. Thus, to derive the error estimates for the AEC analysis, the truth ($X_t$) is subtracted from both sides of this equation:

$$X_a - X_t = X_b - X_t + W[Y_o - Y_t - H(X_b - X_t)] \quad (4)$$

Which leads to the error estimates of the analysis: Ea=Xa−Xt, background: Eb=Xb−Xt, and observation: Eo=Yo−Yt, and thus the equation can be written in terms of the errors:

$$E_a = E_b + W[E_o - H(E_b)] \quad (5)$$

As explained above, the background and observation errors are assumed to be unbiased and uncorrelated on the average (over many realizations), and thus also $\varepsilon(Ea)=0$. This is a valid assumption for AEC-OI since the observations are independent of the background field (i.e. the model simulations did not assimilate these observations), and the background field is an average of many realizations (i.e. the AEC static climatology is constructed from the long-term mean). This implies stationarity; an important assumption in the AEC-OI formulations, allowing computation of the errors based on their expected value ε. However, the expectation operator ε is a theoretical concept that assumes an infinite number of samples, perfect instruments, and perfect models, but in our discrete imperfect space, this is not the case and errors are expected. Therefore, the goal is to minimize the expected error variance of the analysis, and by doing so, the optimal W is determined. The approach used in AEC-OI is based on least squares (root mean square) linear minimization (first derivative set to zero). Applying this concept to equation 5, after squaring both sides, yields:

$$\varepsilon(E_a^2) = \varepsilon(E_b^2) + 2\varepsilon(E_b)W[\varepsilon(E_o) - H(\varepsilon(E_b))] + \{W[\varepsilon(E_o) - H(\varepsilon(E_b))]\}^2 \quad (6)$$

Which is further simplified by the assumption of unbiased and uncorrelated errors to:

$$\varepsilon(E_a^2) = \varepsilon(E_b^2) + 2\varepsilon(E_b)W[\varepsilon(E_o) - H(\varepsilon(E_b))] + W^2[\varepsilon(E_o^2) + H^2(\varepsilon(E_b^2))] \quad (7)$$

Then, taking the derivative with respect to W and setting it to zero:

$$\partial \varepsilon(E_a^2)/\partial W = 2\varepsilon(E_b)[\varepsilon(E_o) - H(\varepsilon(E_b))] + 2W[\varepsilon(E_o^2) + H^2(\varepsilon(E_b^2))] = 0 \quad (8)$$

After further simplification (uncorrelated ε(EbEo)=0), this results in:

$$-2\varepsilon(E_b)H(\varepsilon(E_b)) + 2W[\varepsilon(E_o^2) + H_2(\varepsilon(E_b^2))] = 0 \quad (9)$$

Finally, solving for W, the following is obtained:

$$W = \varepsilon(E_b)H(\varepsilon(E_b))[\varepsilon(E_o^2) + H_2(\varepsilon(E_b^2))]^{-1} \quad (10)$$

Which, after applying H, without loss of generality and for simplicity, can be written in terms of variance (recall: var(x)=σ²=ε([x-ε(x))]²)):

$$W = (\sigma_b)^2[(\sigma_o)^2 + (\sigma_b)^2]^{-1} \quad (11)$$

Equation 11 is for a single observation and a single background. If equation 11 is extended to have many observations and background points, the formulations remain, but are extended to the covariances of the background and observation errors. Recall: cov(x,x)=var(x)=σ²=ε([x-ε(x)]²); for matrices, cov(X,X)=ε([X-ε(X)] ε([X-ε(X)]T), the variance is simply the covariance of a variable with itself. Thus the fully generalized analysis error variance (note that the diagonal of the covariance matrix is the variance) can be obtained by extending equation 5 where instead of squaring both sides, the transpose both sides is taken and after applying H as a linear operator of $E_b$, the following is obtained:

$$P_a = P_b + W[P_o + HP_bH_T]W_T - WHP_b - P_bH_TW_T \quad (12)$$

Where $P_a = \varepsilon(E_aE_{aT})$, $P_o = \varepsilon(E_oE_{oT})$, and $P_b = \varepsilon(E_bE_{bT})$ are the analysis, observation, and background error covariance matrices; respectively. Similarly, equation 11, extended in terms of error covariances, yields:

$$W = P_bH_T[P_o + HP_bH_T]^{-1} \quad (13)$$

The variances (σ) are now the diagonals of the covariance matrices P. So, the optimal W, that yields a minimum error (co)variance for the analysis, is computed from the relative background and observation error (co)variances. Equation 13 (or 11), clearly shows that if the observations are "perfect", then W=1 and the observations maximally influence the analysis; if the background is perfect, then W=0 (or, more realistically, there are no observations and thus $W[Y_o - H(X_b)]=0$), then the analysis reverts back to the background (i.e. $X_a = X_b$).

Lastly, the analysis error covariance can be computed by substituting W (equation 13) back into equation 12:

$$P_a = (I - WH)P_b \quad (14)$$

Since the result is assumed unbiased, it can be inferred that $\varepsilon(X_a)$ is the best estimator of $X_t$.

Error covariances describe how variables, on the average, at different locations are related (in time or space). So in AEC-OI, the problem is simplified to be truly objective since the computation of the variances/covariances, for the observations and the background field, is determined by the correlation length scales—spatial or temporal distance of the available observations to the grid point being analyzed. In AEC-OI, these length scales are modeled via a Gaussian function:

$$R_D = e^{-\frac{D^2}{2L^2}} \quad (15)$$

All observations are assumed to have a similar error covariance since the weighting is based only on distance (D) between the observations and the grid point being analyzed. The length scale (L) is a tuned parameter that the end user can customize depending on need and variables being analyzed. AEC default values are Ld=20, Lt=7 for the AEC physical tracer fields (e.g. temperature) which is derived from the Rossby Radius of deformation at the locale and scales resolved by the model, and Ld=6, Lt=5 for the biological fields—smaller value as gradients in biogeochemical tracers are much higher. Ld and Lt represent the length scales for space (d)—order of kilometers, and time (t)—days; respectively. Both assume isotropic covariance between observations and analysis point. Both of these numbers are the initial bulk values computed for AEC-OI and are expected to be further tuned by end-users. For the 3D ocean (the vertical dimension), AEC implements OI in a topdown 2D layer by layer approach which then gets smoothed by a 9-point running stencil, also topdown, to produce the final 3D AEC-OI field. This effectively projects the higher granularity surface measurements through the water column.

AEC-OI, assumes that the long-term mean (the static climatology) is of constant variance. This is an important step in simplifying and thus speeding up the computations of the OI analysis. This is only possible because, by design, the long term climatology produces a smooth steady state field onto which, all observations are projected equally (i.e. using a consistent isotropic correlation distance function). AEC-OI takes advantage of many simplifications, only possible by the design of the system, to produce a fast analysis whose accuracy increases as the number of observations, assumed accurate, increases. OI has the advantage of not amplifying observational noise, important because of AEC reliance on accurate observations. One of the main advantages is that since the climatology is prebuilt, the background error covariance is precomputed. The error of the analysis was identified by comparing the AEC analysis forecast to the corresponding day in the satellite climatology. Furthermore, AEC-OI operates on one state variable at a time (coincident with the observations), reducing the size of the matrices that must be inverted to solve the analysis.

Figure 2:
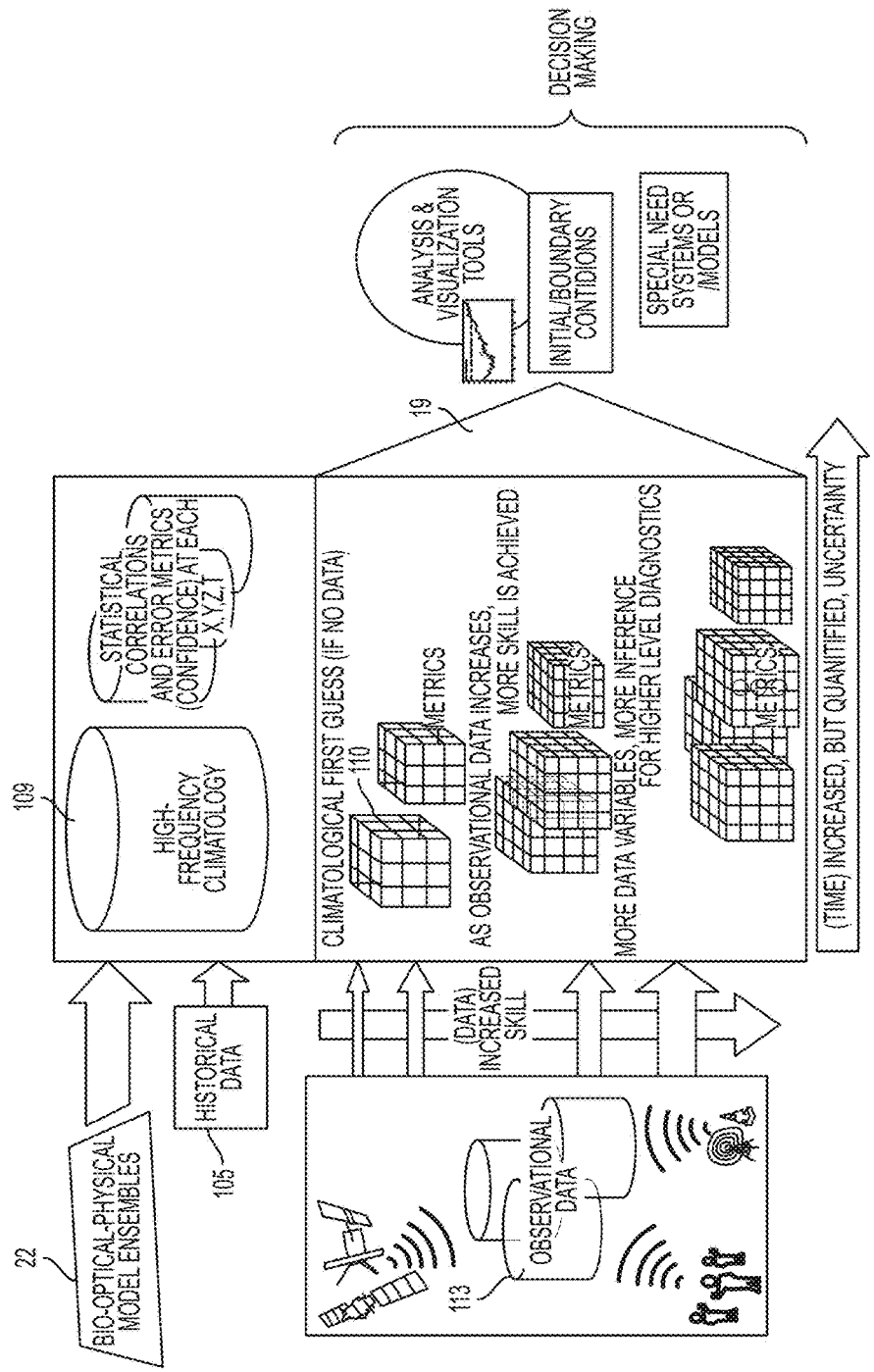
FIG. 2 is pictorial diagram of the data flow of the system and method for AEC.

Referring now to FIG. 2, the system and method of the present embodiment are functionally divided into two phases: a) static climatology 109 constructed from high frequency numerical model output 22 constrained by historical data 105, and b) dynamic climatology 110 including statistical forecasting based on optimal interpolation to blend the static climatology and observations 113 to produce nowcasts/forecast 19 for use directly in decision-making, or indirectly as initial/boundary fields for need-specific models or systems.

Figure 3A:
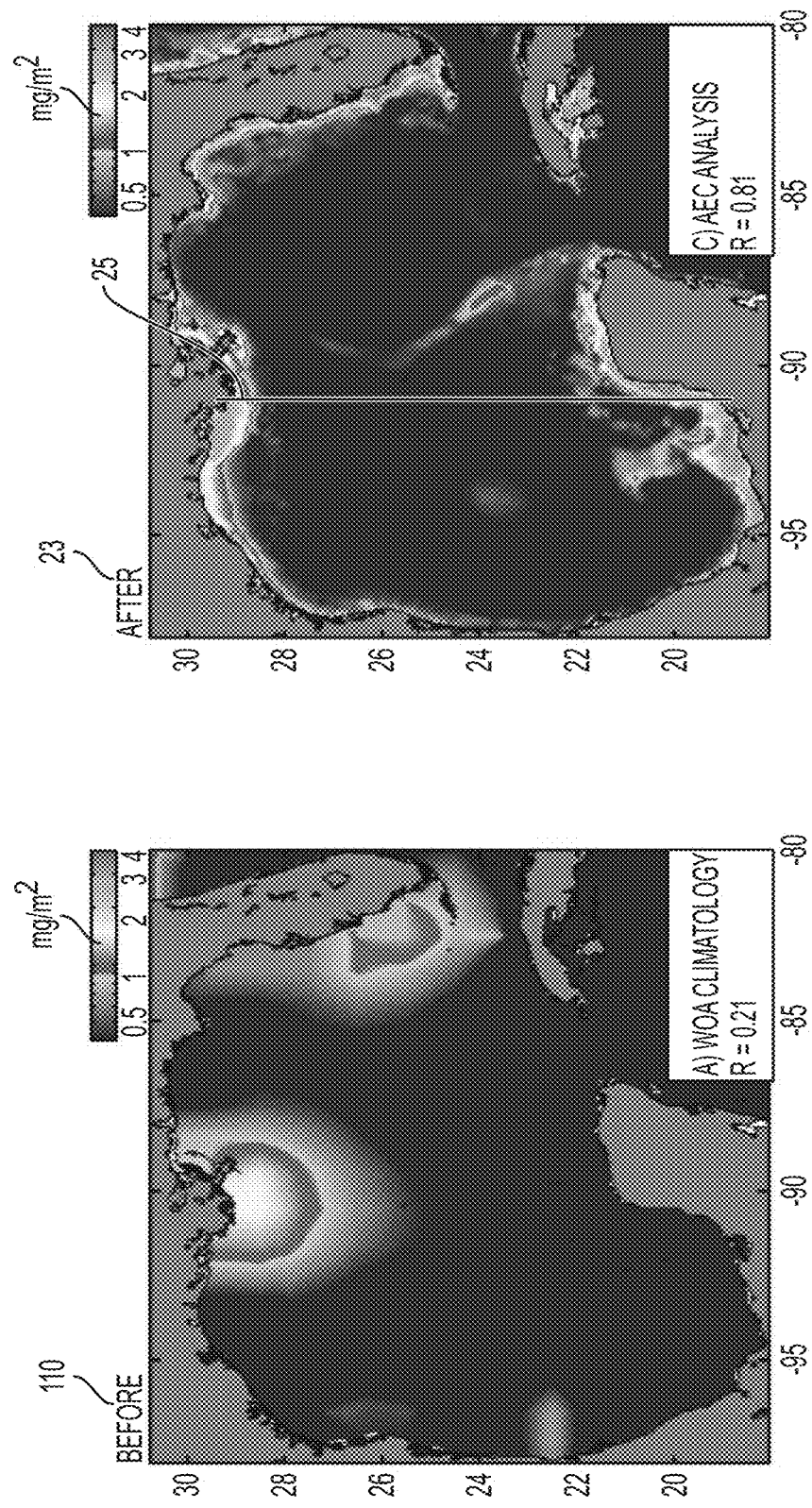
FIGS. 3A-3B are comparison pictorial diagrams of the computation of a parameter value using the prior art methods, and the computation of the parameter value using the system and method for AEC.
Figure 3B:
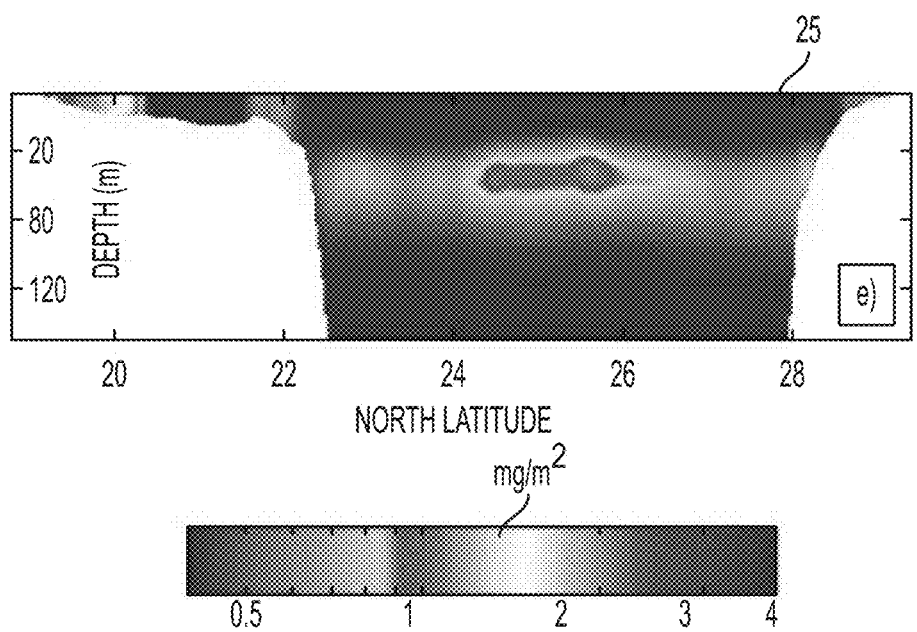

Referring now to FIGS. 3A-3B, for example, a desired ocean forecast for Nov. 16, 2011 can be achieved by providing initial approximation 110 using preconstructed (static) climatology, given representative historical mean conditions for November 16. Depicted is a mean over several years of the chlorophyll climatology for November 16. The correlation between the World Ocean Atlas (a climatology of in situ ocean properties produced by the Ocean Climate Laboratory) chlorophyll climatology product for November and MODIS satellite derived chlorophyll product for Nov. 16, 2011 is 0.21. This correlation is between satellite-derived conditions for Nov. 16, 2011 and static climatology—an estimate of the representative conditions for November 16, any year. When observational data are inserted according to the system and method of the present embodiment—for example, five daily MODIS-Aqua OC3m chlorophyll images are inserted into the climatology for Nov. 11-15, 2011—the system and method of the present embodiment derive an analysis field. Gaining fidelity from the observations, the resulting forecast can be more accurate for the current conditions. In addition, the forecast can provide subsurface prediction, as shown in north-south transect 25 illustrating the depth of the chlorophyll maxima across the basin in FIG. 3B. Subsurface prediction can be made by any of (1) the multivariate spatial covariances that can be used to project the observed surface field to 3D, or (2) the static climatology fields that are 3D, or (3) Optimal Interpolation techniques. In general, because the static climatology was created using a 3D (surface and subsurface) model, the forecast inherently includes a subsurface prediction. Climatology and observations analysis combined 23 are shown for Nov. 16, 2011. The correlation between the resulting Nov. 16, 2011 surface chlorophyll field computed by the system and method of the present embodiment and the MODIS satellite-derived chlorophyll product for Nov. 16, 2011 is 0.81. This correlation is between the satellite-derived conditions for November 16 and the adaptive climatology, i.e. the static climatology adjusted by the insertion of observational data for the period of Nov. 11-15, 2011 to determine a prediction for Nov. 16, 2011. The improvement in correlation—0.6—is a result of the use of the adaptive climatology prediction of the present embodiment over static climatology prediction of the prior art. The description above with respect to FIGS. 3A-3B is simply an example for a particular day that demonstrates a metric that can be used to assess the AEC predictions.

Figure 4:
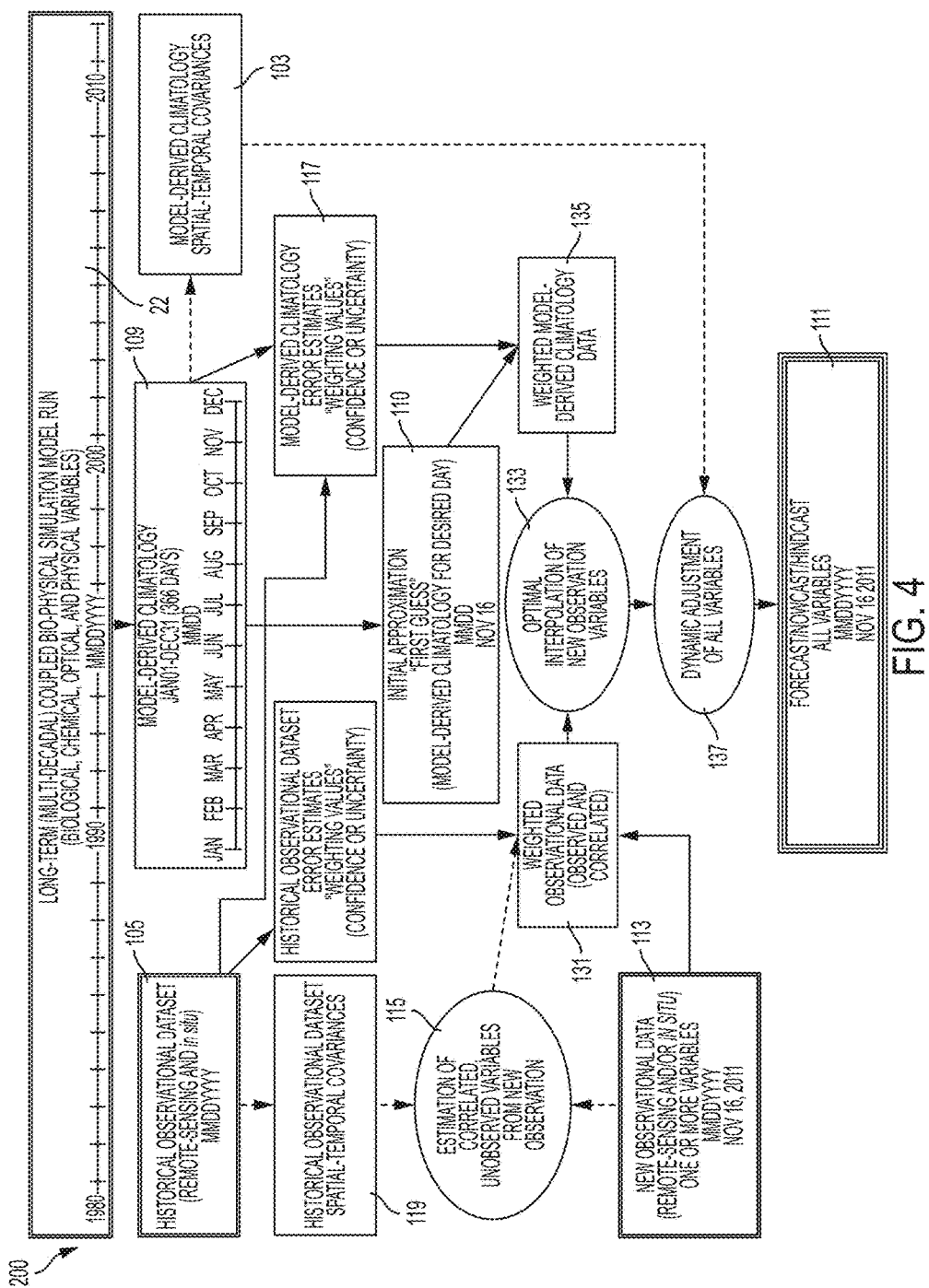
FIG. 4 is a schematic block diagram of an exemplary dataflow for AEC.

Referring now to FIG. 4, dataflow 200 for ecological forecasting can include, but is not limited to including, model 22 that is herein depicted as, for exemplary purposes, a long-term, for example, but not limited to, multi-decadal, coupled bio-physical simulation model that can include biological, chemical, optical, and physical variables. From model 22 is derived climatology dataset 109 of climatology variables are chosen, from which climatology covariances 103 are computed. Climatology error estimates 117 can be computed based on climatology dataset 109 and historical observations 105. Observation dataset 105 can include, but is not limited to including, remotely-sensed and in situ data. Observation variables for a pre-selected month, day, and year can be extracted from historical observation dataset 105. Observation variables can be used to compute observational covariances 119 and observational error estimates 121. Climatology dataset 109 can include, but is not limited to including, climatological variables for each day of the year, and can be used to extract initial approximation 110 for a pre-selected day. Weighted initial approximation 135 can be computed based on initial approximation 110, climatology error estimates 117, and the preselected day. Weighted observational data 131 can be computed based on observational error estimates 121, new observational data 113, and optionally, depending on new observational data 113, observational covariances 119. Weighted initial approximation 135 can be adjusted by combining weighted initial approximation 135 and weighted new observational data 113 using optimal interpolation. If climatology covariances are computed, modified climatological variables and modified observational variables 137 are computed based on climatology covariances 103.

Figure 5:
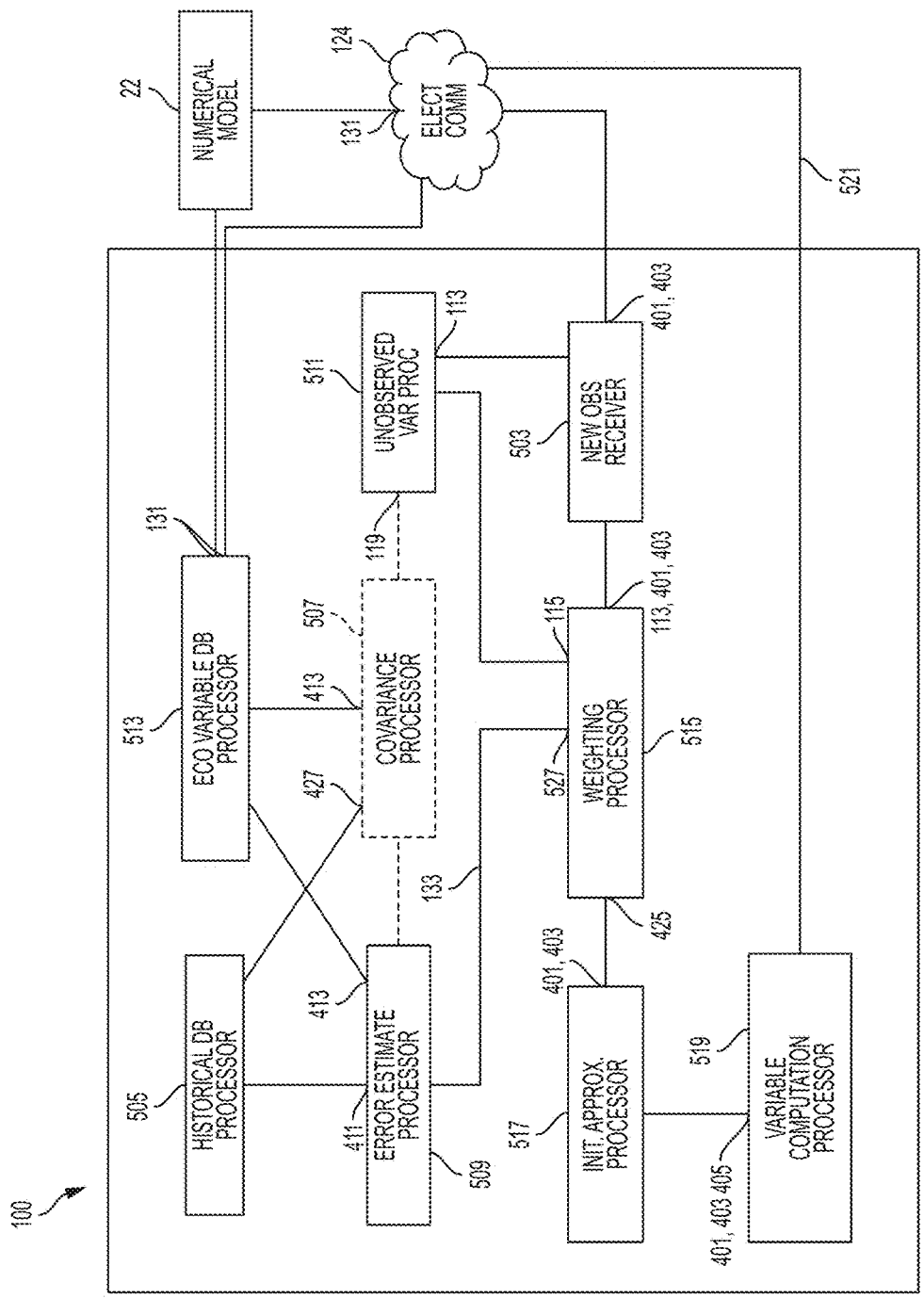
FIG. 5 is a schematic block diagram of the system for AEC.

Referring now primarily to FIG. 5, system 100 for non-numerical model computation of ecological variables 521 can include, but is not limited to including, ecological variable database processor 513 constructing climatology dataset 109 (FIG. 4) having ecological variables 413 for each calendar day based on long term model 22 simulation data including a plurality of variables, historical database processor 505 extracting, from historical observations dataset 105 (FIG. 4), observation variables 411 that match at least two of the ecological variables 413, and error estimate processor 509 computing climatology error estimates 117 of climatology dataset 109 (FIG. 4) based on historical observations dataset 105 (FIG. 4), and computing observational error estimates 121 (FIG. 4) based on the historical observations dataset 105 (FIG. 4). Climatology error estimates 117 (FIG. 4) and observational error estimates 121 (FIG. 4) are referred to herein collectively as weights 527. System 100 can further include initial approximation processor 516 extracting initial approximation 110 (FIG. 4) of at least one climatology variable, for pre-selected day 401, from climatology dataset 109 (FIG. 4), weighting processor 515 weighting initial approximation 110 (FIG. 4) based on climatology error estimates 117 (FIG. 4) and the pre-selected day 401, and new observation receiver 503 receiving at least one new observational variable 113 (FIG. 4) for pre-selected month, day, and year 403. Weighting processor 515 can apply weights 527, based on observation error estimates 121 (FIG. 4), to the at least one new observational variable 113 (FIG. 4). Initial approximation processor 517 can adjust initial approximation 110 (FIG. 4) by combining the weighted at least one new observational variable 131 (FIG. 4) and weighted initial approximation 135 (FIG. 4) using optimal interpolation. System 100 can also include variable computation processor 519 computing computed ecological variables 521 for pre-selected month, day, and year 403 based on the adjusted initial approximation 137 (FIG. 4), and can transmit computed ecological variables 521 outside of system 100 using, for example, but not limited to, electronic communications medium 124. System 100 can optionally include covariance processor 507 computing climatology spatio-temporal multi-variate covariances 103 (FIG. 4) among the climatology values 109 (FIG. 4), and computing observational spatio-temporal multi-variate covariances 119 (FIG. 4) among the observational values 105 (FIG. 4). System 100 can further optionally include unobserved variable processor 511 computing at least one unobserved variable 115 (FIG. 4) based on the received at least one new observational variable 113 (FIG. 4) and the observational covariances 119 (FIG. 4). Weighting processor 515 can optionally weight at least one unobserved variable 115 (FIG. 4) based on the observational error estimates 119 (FIG. 4). Initial approximation processor 517 can adjust initial approximation 110 (FIG. 4) by combining weighted at least one new observational variable 131 (FIG. 4), weighted at least one unobserved variable, and weighted initial approximation 133 (FIG. 4) using optimal interpolation, and can dynamically modify adjusted initial approximation 133 (FIG. 4) based on climatology covariances 103 (FIG. 4). Variable computation processor 519 can optionally compute values of computed ecological variables 521 (FIG. 4) for pre-selected month, day, and year 403 based on the dynamically modified adjusted initial approximation 137 (FIG. 4).

The system and method can also include an on-line tool to create user-requested output. A web interface can provide tools for visualization of satellite and model fields, time-series, correlations, and utilization of in-situ data and metadata. To facilitate ease-of-use, and performance speed, a back-end application can parse the requests from a graphical user interface client and stream visualizations, for example, but not limited to, maps and time-series plots, to the client application. The selected subset of data can be available for download in a variety of formats.

Figure 6:
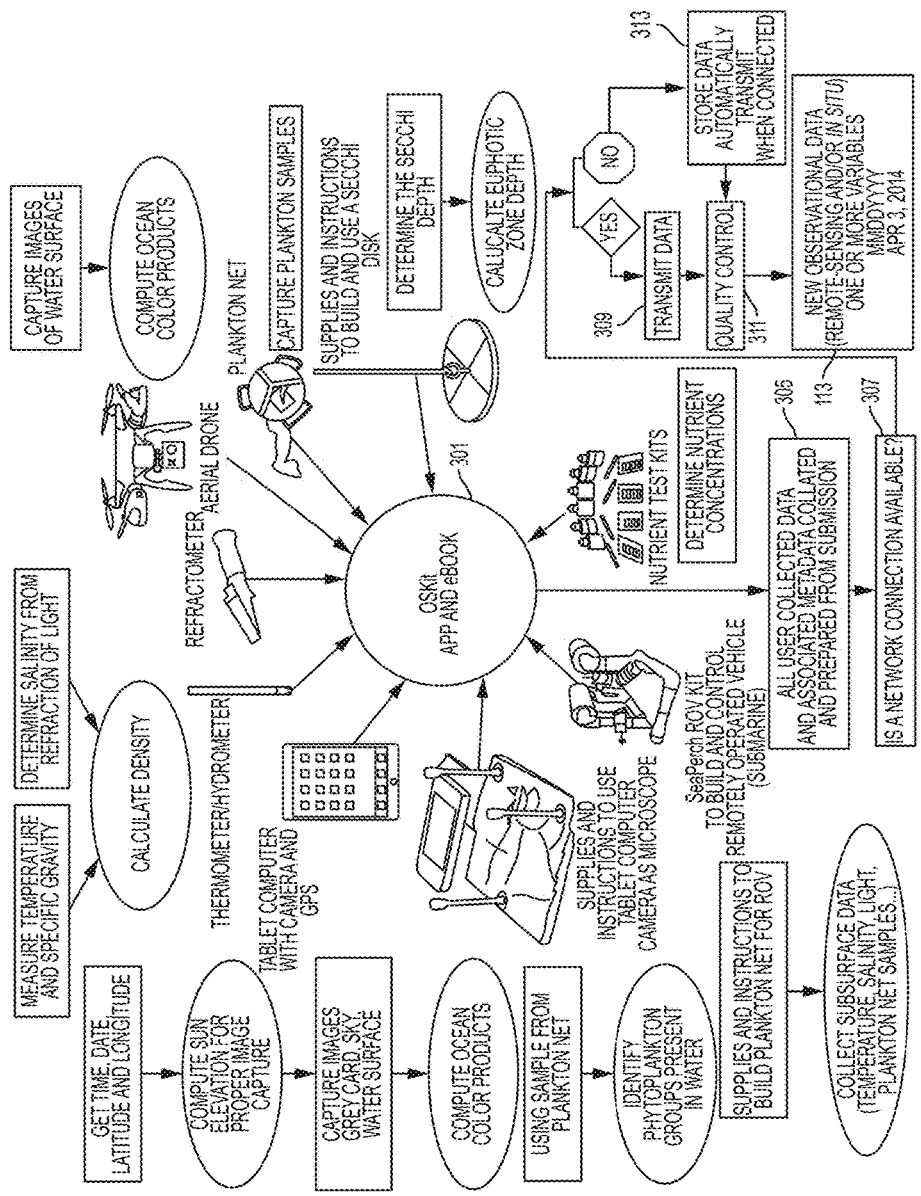
FIG. 6 is a pictorial description of an exemplary ocean sampling kit for use in AEC.

Referring now primarily to FIG. 6, ocean sampling kit application and eBook 301 can include, but is not limited to including interfaces for collection devices such as, for example, but not limited to, a tablet computer with camera and GPS to capture images of the water surface for computing ocean color products, a plankton net for capturing plankton samples, a thermometer/hydrometer for measuring temperature and salinity, SeaPerch ROV kit to build and control a remotely operated vehicle, nutrient test kids, and instructions to build/use a Secchi disk to calculate euphotic zone depth. Kit application 301 collects 305 data and associated metadata and, if 307 a network connection is available, transmits 309 data through quality control 311 to system 100 (FIG. 5) as new observational data 113. If 307 the network connection is not available, the collected data are automatically stored and transmitted, through quality control 311, when the network connection is available to system 100 (FIG. 5) as new observational data 113.

Figure 7:
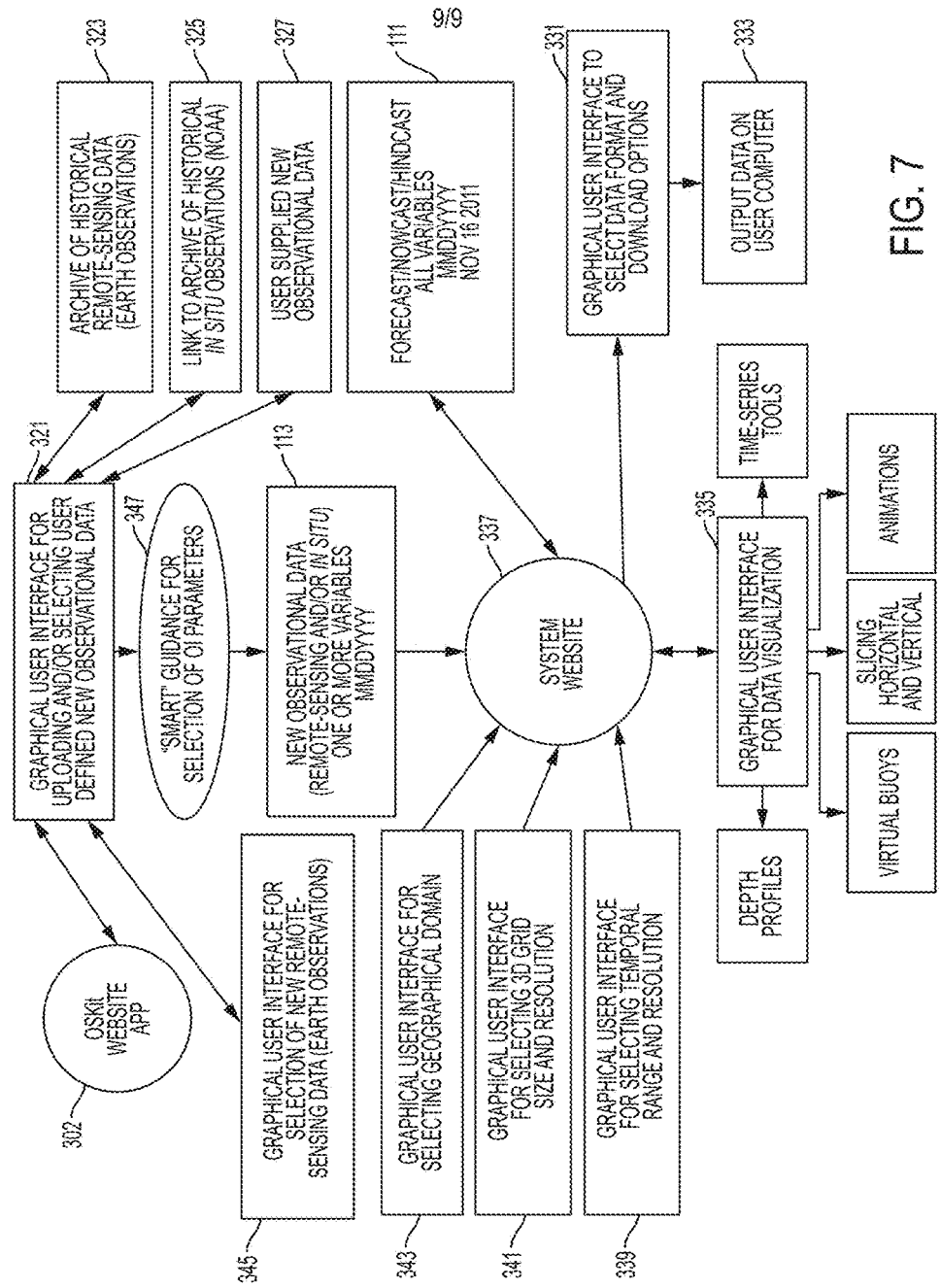
FIG. 7 is a schematic block diagram of an exemplary dataflow of the website or web-portal for AEC.

Referring now primarily to FIG. 7, ocean website or web-portal application 302 can include, but is not limited to including, uploading graphical user interface (GUI) 321 for uploading and/or selecting user-defined new observational data 113 (FIG. 4) and a GUI 345 for receiving new remote-sensing data from which can include, but is not limited to including, archive of historical remote-sensing data (earth observations) 323, link to archive of historical in situ observations 325 from, for example, National Oceanic and Atmospheric Administration, and user-supplied new observational data 327. Kit website application 302 can also include smart guidance 347 for selection of OI parameters used to process new observational data 113 which are provided to system website 337 through electronic communications media 124 (FIG. 5). GUI 343 can provide a selected geographical domain to system website 337. GUI 341 can provide a selected 3D grid size and resolution to system website 337. GUI 339 can provide a selected temporal range and resolution to system website 337. Computed variables 111 can also be provided to system website 337. New observational data 113 for a selected day and year can also be provided to system website 337. System website 337 provides GUIs 331 and 335 to allow selection of data format and download options and data visualization respectively. Data visualization can take the form of, for example, but not limited to, depth profiles, virtual buoys, animation, time-series tools, and slicing—horizontal and vertical. Output data 333 can be formatted according to GUI 331.

One possible application of the system and method of the present embodiment is to extend model runs into the future using, for example, but not limited to, forcing fields derived from NASA's Modern Era Retrospective Analysis for Research and Applications (MERRA) and from various IPCC atmospheric Coupled Model Intercomparison Project (CMIP) forcing (climate scenarios) to provide probabilistic ecosystem impact assessments for the next 80-100 years. The resulting variables from the system and method can be interpolated, sub-sampled, averaged, consolidated, etc. as needed to provide initial and/or boundary conditions (cut-outs) for many types of management models.

Embodiments of the present teachings are directed to computer systems such as system 100 (FIG. 5) for accomplishing the methods such as method 150 (FIGS. 1A-1B) discussed in the description herein, and to computer readable media containing programs for accomplishing these methods. The raw data and results can be stored for future retrieval and processing, printed, displayed, transferred to another computer, and/or transferred elsewhere. Communications links such as electronic communications 124 (FIG. 5) can be wired or wireless, for example, using cellular communication systems, military communications systems, and satellite communications systems. In an exemplary embodiment, the software for the system is written in FORTRAN and C. The system can operate on a computer having a variable number of CPUs. Other alternative computer platforms can be used. The operating system can be, for example, but is not limited to, LINUX®.

The present embodiment is also directed to software for accomplishing the methods discussed herein, and computer readable media storing software for accomplishing these methods. The various modules described herein can be accomplished on the same CPU, or can be accomplished on different computers. In compliance with the statute, the present embodiment has been described in language more or less specific as to structural and methodical features. It is to be understood, however, that the present embodiment is not limited to the specific features shown and described, since the means herein disclosed comprise preferred forms of putting the present embodiment into effect.

Methods such as method 150 (FIGS. 1A-1B) of the present embodiment can be, in whole or in part, implemented electronically. Signals representing actions taken by elements of the system and other disclosed embodiments can travel over at least one live communications network 124 (FIG. 5). Control and data information can be electronically executed and stored on at least one computer-readable medium. System 100 (FIG. 5) can be implemented to execute on at least one computer node in at least one live communications network 124 (FIG. 5). Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form including, but not limited to, Graphic Interchange Format (GIF), Joint Photographic Experts Group (JPEG), Portable Network Graphics (PNG), Scalable Vector Graphics (SVG), and Tagged Image File Format (TIFF).

Although the present teachings have been described with respect to various embodiments, it should be realized these teachings are also capable of a wide variety of further and other embodiments.

The invention claimed is:

1. A method for adaptive ecosystem climatology, comprising:
   obtaining, using a processing device, a long-term, biophysical model that spans a time period of at least ten years;
   obtaining, using the processing device, a long-term, satellite timeseries that spans the time period;
   using the processing device, the long-term, bio-physical model and the long-term, image timeseries to generate a static climatology that comprises a plurality of ecological variables for each calendar day, wherein each of the plurality of ecological variables is a temporal daily average over the time period for the corresponding calendar day;
   using the processing device, independent, historical observations and the static climatology to determine a climatology error estimate for each of the plurality of ecological variables on each calendar day;
   using the processing device and the independent, historical observations to determine an observational error estimate for each of the plurality of ecological variables;
   generating, using the processing device, an initial approximation of an ecological variable of the plurality of ecological variables in the static climatology for a selected day;
   weighting, using the processing device, the initial approximation based on the error estimate of the ecological variable for the selected day;
   rendering, using the processing device, a portion of the static climatology on a user display;
   receiving, using the processing device, a new observational value of the ecological variable for the selected day and a preselected year;
   weighting, using the processing device, the new observational value based on the observation error estimate for the ecological variable;
   using the processing device and optimal interpolation to adjust the initial approximation based on the weighted initial approximation and the weighted new observational value;
   in response to determining, without using a numerical model, a predicted value for the ecological variable on the selected day and the selected year based on the adjusted initial approximation, updating, using the processing device, the rendering of the portion of the static climatology on the user display to account for the predicted value.

2. The method of claim 1, wherein the method further comprises, in response determining that the ecological variable is unobserved:
   determining climatological covariances based on the static climatology;
   determining observational covariances based on the independent, historical observations;
   determining an unobserved variable based on the new observation value and the observational covariances;
   weighting the unobserved variable based on the observational error estimate;
   using optimal interpolation to adjust the initial approximation by combining the weighted new observation value, the weighted unobserved variable; and the weighted initial approximation;
   dynamically modifying the adjusted initial approximation based on the climatological covariances; and
   determining, without use of the numerical model, a second predicted value for the ecological variable on the selected day and the selected year based on the modified, adjusted initial approximation.

3. The method of claim 1, wherein the independent, historical observations comprises satellite timeseries data.

4. The method of claim 1, further comprising:
   providing a notification that the new observational value of the ecological variable has been received, wherein the initial approximation is adjusted and the predicted value is determined in response to a user request to update the user display to include the new observational value.

5. The method of claim 1, wherein the initial approximation comprises a three-dimensional gridded field of ocean variables, and wherein the new observational value is comprised by a two-dimensional ocean layer of a plurality of ocean layers that are incorporated from a top layer to a bottom layer.

6. A method for adaptive ecosystem climatology, comprising:
   obtaining, using a processing device, a long-term, biophysical model that spans a time period of at least ten years;
   obtaining, using the processing device, a long-term, satellite timeseries that spans the time period;
   using the processing device, the long-term, bio-physical model and the long-term, image timeseries to generate a static climatology that comprises a plurality of ecological variables for each calendar day, wherein each of the plurality of ecological variables is a temporal daily average over the time period for the corresponding calendar day;
   using the processing device, independent, historical observations and the static climatology to determine a climatology error estimate for each of the plurality of ecological variables on each calendar day;
   using the processing device and the independent, historical observations to determine an observational error estimate for each of the plurality of ecological variables;
   generating, using the processing device, an initial approximation of an ecological variable of the plurality of ecological variables in the static climatology for a selected day;
   weighting, using the processing device, the initial approximation based on the error estimate of the ecological variable for the selected day;
   rendering, using the processing device, a portion of the static climatology on a user display;
   receiving a new observational value of the ecological variable for the selected day and a preselected year;
   weighting, using the processing device, the new observational value based on the observation error estimate for the ecological variable;
   using the processing device and optimal interpolation to adjust the initial approximation based on the weighted initial approximation and the weighted new observational value;
   in response to determining, without using a numerical model, a predicted value for the ecological variable on the selected day and the selected year based on the adjusted initial approximation, updating, using the processing device, the rendering of the portion of the static climatology on the user display to account for the predicted value; and in response to determining that the ecological variable is unobserved, determining, without use of the numerical model and using the processing device, a second predicted value for the ecological variable on the selected day and the selected year based on climatological covariances from the static climatology and observational covariances from the independent, historical observations.

7. The method of claim 6, wherein determining the second predicted value comprises:

determining climatological covariances based on the static climatology;

determining observational covariances based on the independent, historical observations;

determining an unobserved variable based on the new observation value and the observational covariances;

weighting the unobserved variable based on the observational error estimate;

using optimal interpolation to adjust the initial approximation by combining the weighted new observation value, the weighted unobserved variable; and the weighted initial approximation;

dynamically modifying the adjusted initial approximation based on the climatological covariances; and determining, without use of the numerical model, a second predicted value for the ecological variable on the selected day and the selected year based on the modified, adjusted initial approximation.

8. The method of claim 6, wherein the independent, historical observations comprises satellite timeseries data.

9. The method of claim 6, further comprising:

providing a notification that the new observational value of the ecological variable has been received, wherein the initial approximation is adjusted and the predicted value is determined in response to a user request to update the user display to include the new observational value.

10. The method of claim 6, wherein the initial approximation comprises a three-dimensional gridded field of ocean variables, and wherein the new observational value is comprised by a two-dimensional ocean layer of a plurality of ocean layers that are incorporated from a top layer to a bottom layer.

11. A method for adaptive ecosystem climatology, comprising:

obtaining, using a processing device, a long-term, bio-physical model that spans a time period of at least ten years;

obtaining, using the processing device, a long-term, satellite timeseries that spans the time period;

using the processing device, the long-term, bio-physical model and the long-term, image timeseries to generate a static climatology that comprises a plurality of ecological variables for each calendar day, wherein each of the plurality of ecological variables is a temporal daily average over the time period for the corresponding calendar day;

using the processing device, independent, historical observations and the static climatology to determine a climatology error estimate for each of the plurality of ecological variables on each calendar day;

using the processing device and the independent, historical observations to determine an observational error estimate for each of the plurality of ecological variables;

generating, using the processing device, an initial approximation of an ecological variable of the plurality of ecological variables in the static climatology for a selected day;

weighting, using the processing device, the initial approximation based on the error estimate of the ecological variable for the selected day;

rendering, using the processing device, a portion of the static climatology on a user display;

providing, using the processing device, a notification that a new observational value of the ecological variable has been received for the selected day and a preselected year, wherein the initial approximation is adjusted and the predicted value is determined;

weighting, using the processing device, the new observational value based on the observation error estimate for the ecological variable; and in response to a user request to update the user display to include the new observational value:

using the processing device and optimal interpolation to adjust the initial approximation based on the weighted initial approximation and the weighted new observational value;

determining, without using a numerical model and using the processing device, a predicted value for the ecological variable on the selected day and the selected year based on the adjusted initial approximation; and updating, using the processing device, the rendering of the portion of the static climatology on the user display to account for the predicted value.

12. The method of claim 11, wherein the method further comprises, in response determining that the ecological variable is unobserved:

determining climatological covariances based on the static climatology;

determining observational covariances based on the independent, historical observations;

determining an unobserved variable based on the new observation value and the observational covariances;

weighting the unobserved variable based on the observational error estimate;

using optimal interpolation to adjust the initial approximation by combining the weighted new observation value, the weighted unobserved variable; and the weighted initial approximation;

dynamically modifying the adjusted initial approximation based on the climatological covariances; and determining, without use of the numerical model, a second predicted value for the ecological variable on the selected day and the selected year based on the modified, adjusted initial approximation.

13. The method of claim 11, wherein the independent, historical observations comprises satellite timeseries data.

14. The method of claim 11, wherein the initial approximation comprises a three-dimensional gridded field of ocean variables, and wherein the new observational value is comprised by a two-dimensional ocean layer of a plurality of ocean layers that are incorporated from a top layer to a bottom layer.

15. The method of claim 1, further comprising:

receiving data from a collection device; and using the data to obtain the long-term bio-physical model.

16. The method of claim 1, further comprising:
receiving data from a plurality of collection devices; and
using the data to obtain the long-term bio-physical model.

17. The method of claim 16, wherein the plurality of collection devices comprise:
a computer;
a camera;
a GPS;
a plankton net;
a nutrient test kit;
a thermometer;
a hydrometer;
a Secchi disk; or
a remotely operated vehicle kit.

18. The method of claim 1, wherein the processing device comprises:
an ecological variable database processor.

19. The method of claim 18, wherein the processing device further comprises:
a historical database processor.

20. The method of claim 19, wherein the processing device further comprises:
an error estimate processor;
a covariance processor;
an unobserved variable processor;
an initial approximation processor;
a weighting processor;
a new observation receiver; and
a variable computation processor.

* * * * *